United States Patent
Derscheid et al.

(10) Patent No.: US 7,481,756 B2
(45) Date of Patent: Jan. 27, 2009

(54) ROLLER ASSEMBLY FOR AGRICULTURAL BALER

(75) Inventors: Daniel Eric Derscheid, Ottumwa, IA (US); Bradley Joe Hitchler, Ottumwa, IA (US); Darwin Daniel Fish, Ottumwa, IA (US); Jeremy Michael Erdmann, Floris, IA (US); Charles Scott Sloan, Blakesburg, IA (US); Henry Dennis Anstey, Ottumwa, IA (US)

(73) Assignee: Deere & Company, Moline, IL (US)

( * ) Notice: Subject to any disclaimer, the term of this patent is extended or adjusted under 35 U.S.C. 154(b) by 38 days.

(21) Appl. No.: 11/495,425

(22) Filed: Jul. 28, 2006

(65) Prior Publication Data

US 2008/0022864 A1 Jan. 31, 2008

(51) Int. Cl.
*F16C 13/00* (2006.01)
*B21K 19/00* (2006.01)
*A01D 89/00* (2006.01)

(52) U.S. Cl. .................. 492/47; 29/891; 29/895.22; 29/898.07; 384/537

(58) Field of Classification Search ............... 492/47; 29/891; 100/35, 87; 384/537
See application file for complete search history.

(56) References Cited

U.S. PATENT DOCUMENTS

| 1,889,064 | A | | 11/1932 | Dunham |
| 4,372,247 | A | * | 2/1983 | Calabrese .............. 118/116 |
| 4,502,738 | A | | 3/1985 | Nauta |
| 5,333,516 | A | * | 8/1994 | Edwards et al. ........ 74/665 GC |
| 5,448,944 | A | | 9/1995 | Line et al. |
| 5,482,383 | A | | 1/1996 | Gantt et al. |
| 5,582,099 | A | * | 12/1996 | Rosser .................. 100/35 |
| 5,584,584 | A | | 12/1996 | Line et al. |
| 5,660,484 | A | | 8/1997 | Peel |
| 6,250,815 | B1 | | 6/2001 | Picone et al. |
| 6,623,167 | B2 | * | 9/2003 | Bass et al. ............. 384/537 |

OTHER PUBLICATIONS

Take-up Bearings Information on GlobalSpec (Online, http;//mechanical-components.globalspec.com), pp. 1-2.*

* cited by examiner

*Primary Examiner*—David P Bryant
*Assistant Examiner*—Sarang Afzali

(57) ABSTRACT

A roller assembly for use with an agricultural baler is configured to be mounted to a housing of the baler in a manner that avoids transmitting an undue axial load to a bearing of the roller assembly. An assogated method is disclosed.

9 Claims, 5 Drawing Sheets

ROLLER ASSEMBLY FOR AGRICULTURAL BALER

FIELD OF THE DISCLOSURE

The present disclosure relates to a roller assembly for an agricultural baler. An associated method is disclosed.

BACKGROUND OF THE DISCLOSURE

Round balers for producing round bales may include a number of rotatable roller assemblies about which bale-forming belt(s) may be trained. An arrangement for mounting such a roller assembly is disclosed in U.S. Pat. No. 6,623,167, the entirety of which is hereby incorporated by reference herein.

SUMMARY OF THE DISCLOSURE

According to the present disclosure, there is provided a roller assembly for use in, for example, an agricultural baler such as a round baler, the roller assembly is configured to be mounted to a housing of the baler in a manner that avoids transmitting an undue axial load to a bearing of the roller assembly. An associated method is disclosed.

In an illustrated example, the roller assembly comprises a shaft, a bearing, a bearing housing, a mount and a housing attachment arrangement. The inner race of the bearing mates generally with the non-circular cross-section of the shaft and is clamped to the shaft for rotation therewith. The bearing housing is disposed about the outer race so as to support the bearing. The housing attachment arrangement secures the bearing housing to a mount by a mounting force directed substantially in a plane positioned at a right angle to an axis of the shaft. Exemplarily, the housing attachment arrangement comprises a plurality of fasteners each of which extends longitudinally in a plane postponed at a right angle to the shaft axis. In such a case, each fastener secures a respective tab of the bearing housing to a mounting bracket fixed to a wall of the baler housing.

The above and other features will become apparent from the following description and the attached drawings.

BRIEF DESCRIPTION OF THE DRAWINGS

The detailed description of the drawings refers to the accompanying figures in which.

DETAILED DESCRIPTION OF THE DRAWINGS

Figure 1:
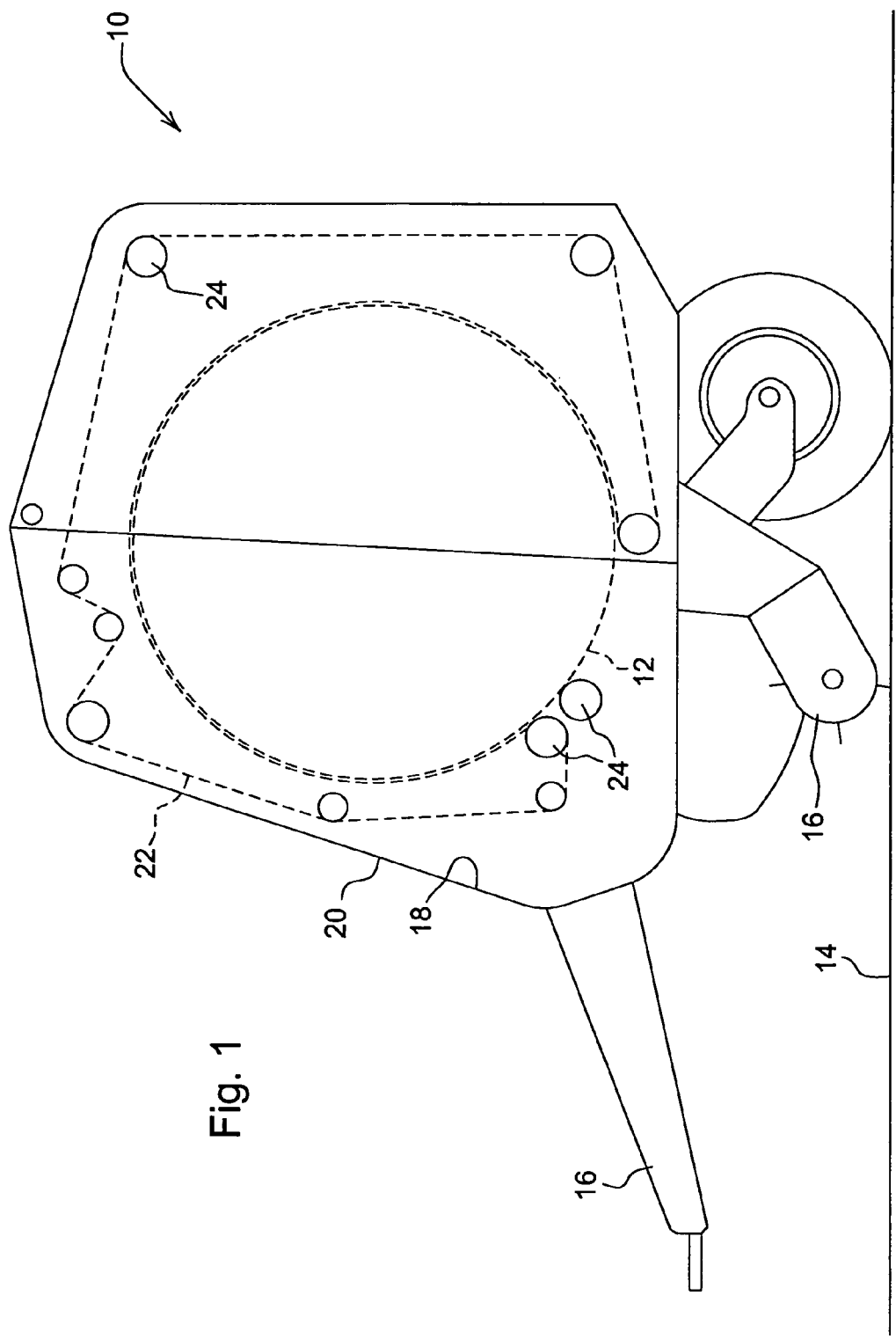
FIG. 1 is a side elevation view of a round baler comprising a plurality of roller assemblies about which bale-forming belt(s) are trained.

Referring to FIG. 1, there is shown a mobile agricultural baler 10 in the form of, for example, a round baler for forming round bales 12. When the baler 10 is advanced along the ground 14 by a vehicle (not shown) via an attachment 16, the baler 10 elevates material from the ground 14 by use of a pick up 16 and feeds the material into a chamber 18 of a baler housing 20 of the baler 10. One or more bale-forming belt(s) 22 are trained about a plurality of rotatable roller assemblies 24 for advancement thereabout to form the material into the growing bale 12. Once the bale 12 reaches a desired size, it may be discharged from the baler 10 to make room for formation of another bale.

Each roller assembly 24 is mounted to the baler housing 20 in a manner that avoids transmission of an undue axial load to a bearing of the assembly 24. It is to be understood that the roller assembly 24 discussed in more detail herein may be used with other types of agricultural balers or, more generally, with other types of machines.

Figure 2:
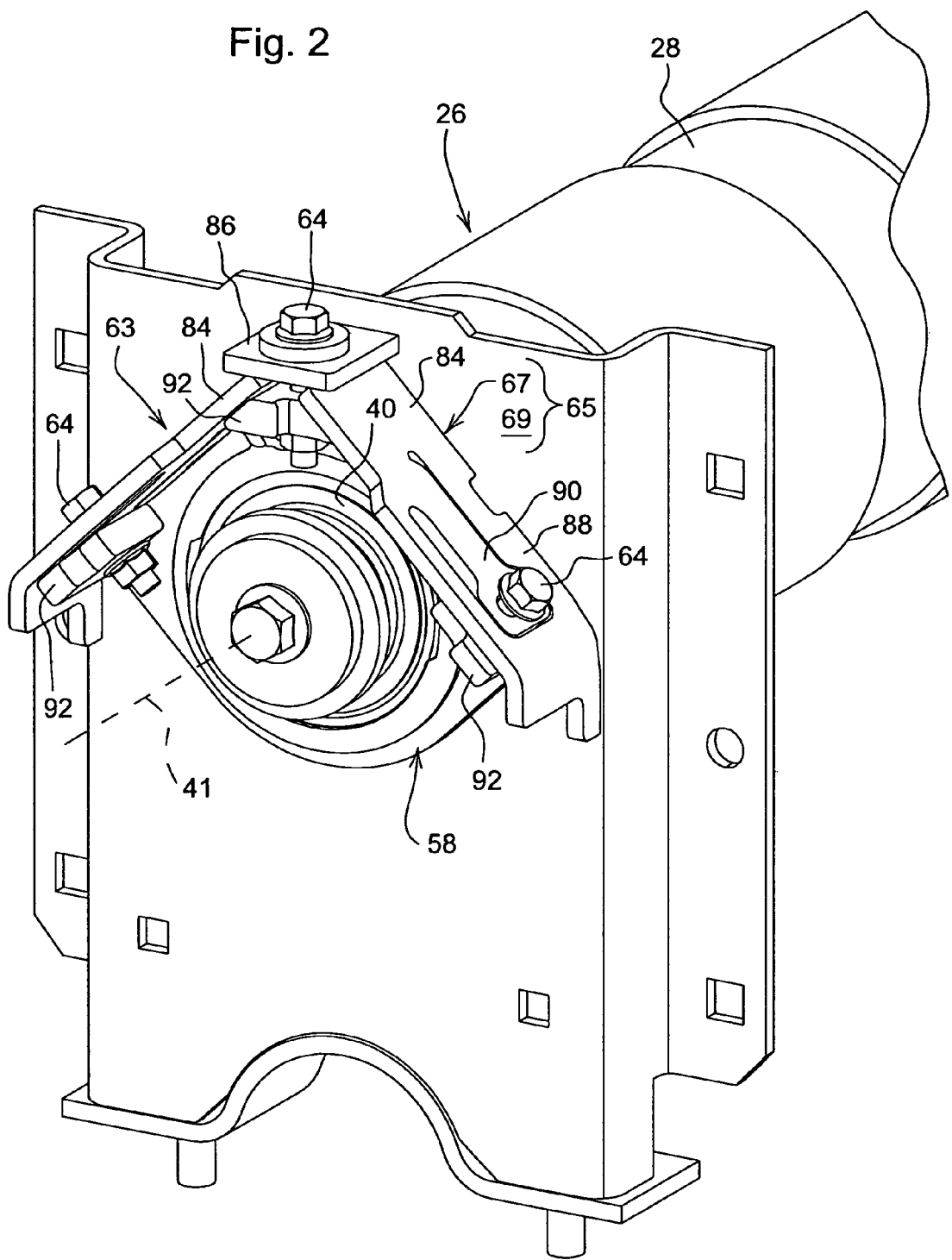
FIG. 2 is a perspective view showing mounting of an end of a roller assembly of FIG. 1 to a wall of the baler housing.
Figure 3:
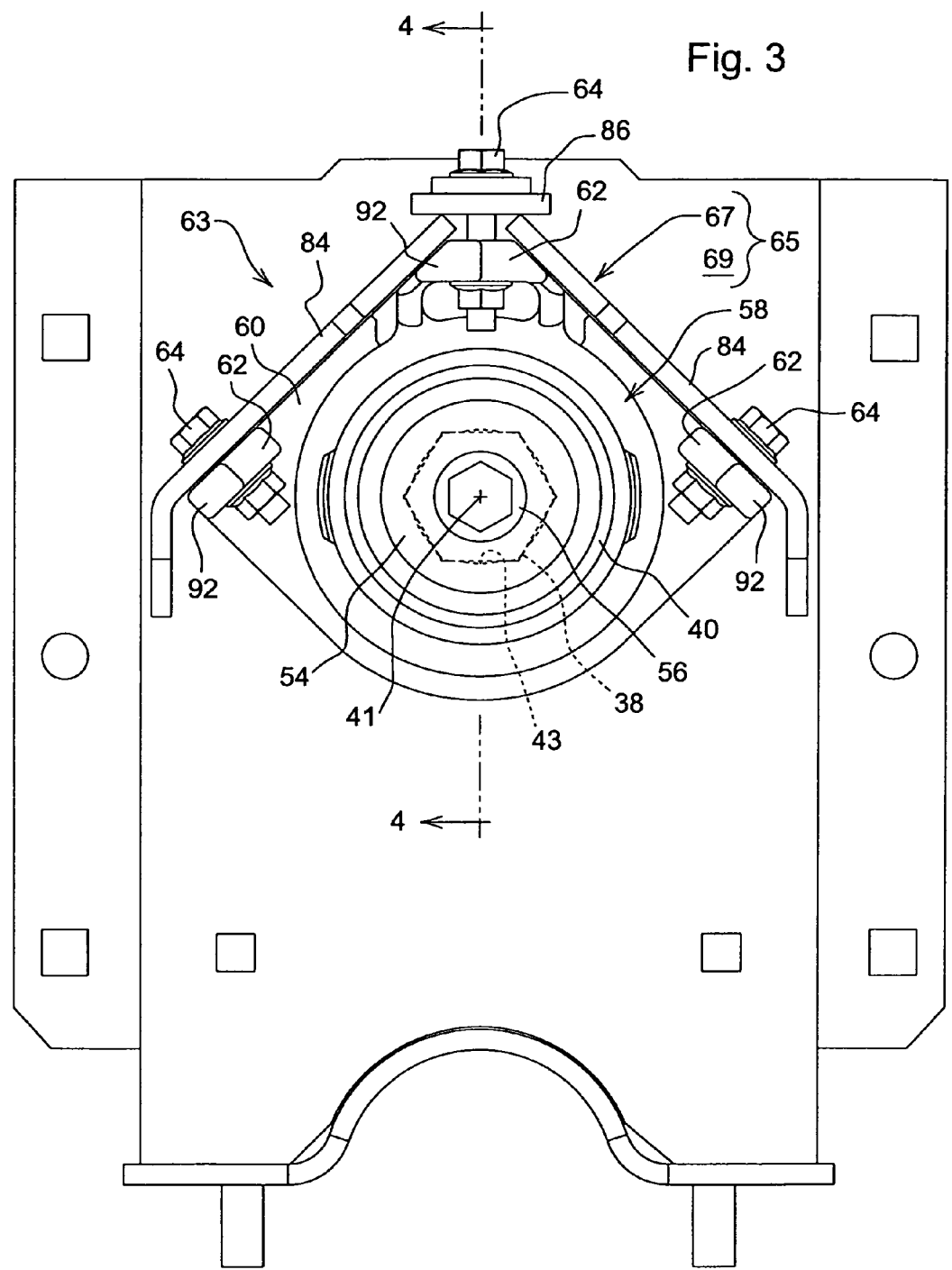
FIG. 3 is an end elevation view of the roller assembly of FIG. 2.
Figure 4:
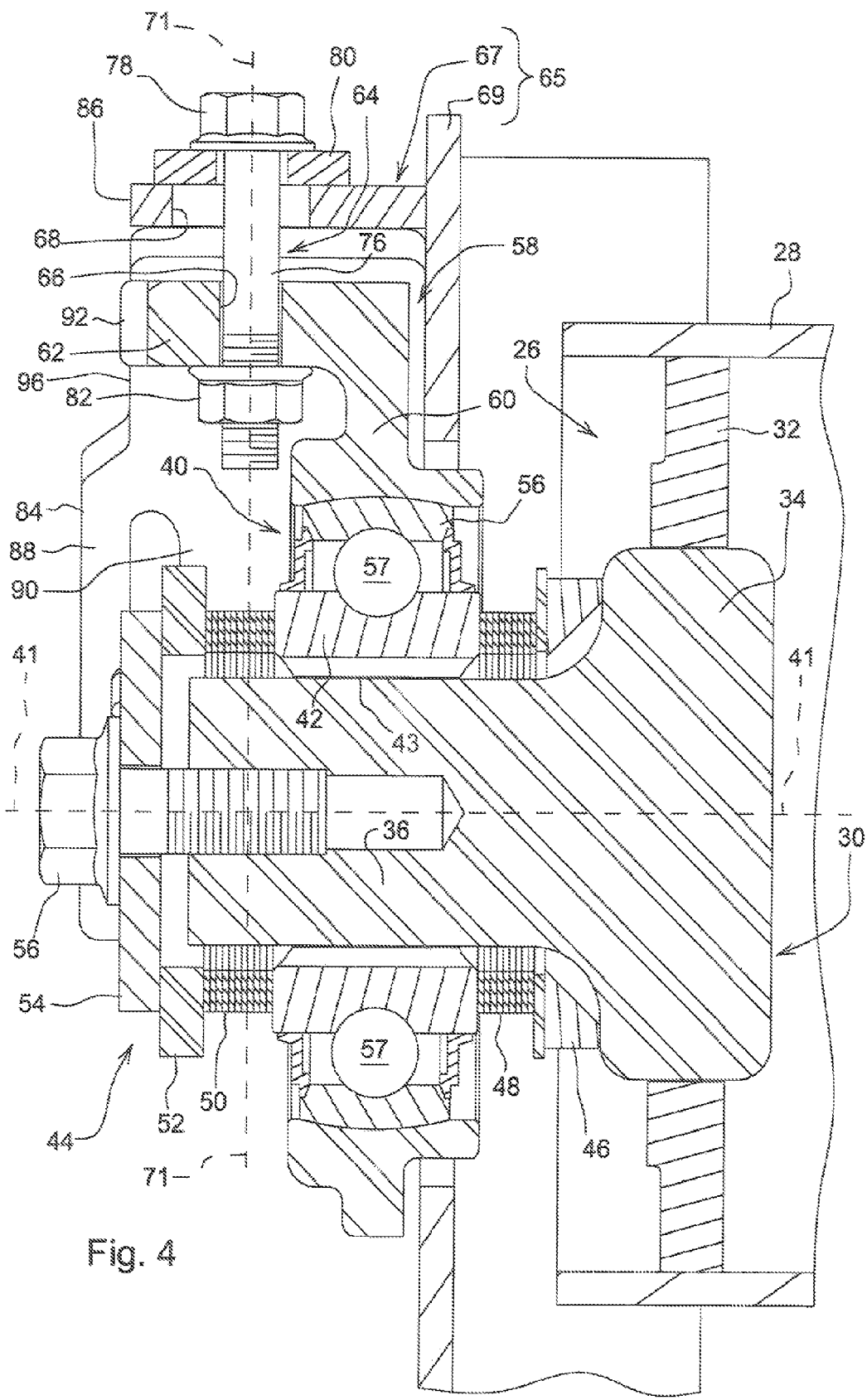
FIG. 4 is a sectional view taken along lines 4-4 of FIG. 3.

Referring to FIGS. 2-4 together and, in particular, FIG. 4, the roller assembly 24 has a shaft 26 about which the belts 22 are trained. Illustratively, the shaft 26 includes a hollow cylindrical belt-engaging roll tube 28 in the chamber 18. The roll tube 28 is mounted at one or both of its ends to a stub shaft 30 by use of a ring plate 32 secured to an inner surface of the roll tube 28 and an outer surface of a disk portion 34 of the stub shaft 30.

An axial portion 36 of the stub shaft has a non-circular cross-section 38 on which a bearing 40 mounted, as shown, for example, in FIGS. 3 and 4. An inner race 42 of the bearing 40 has an inner surface 43 received on and shaped complementary to the non-circular cross-section 38 so as to mate generally therewith, as shown by the phantom lines in FIG. 3. The non-circular cross-section 38 is, for example, hexagonal although a wide variety of multifaceted or other non-circular shapes are possible. Such a non-circular cross-section 38 enables the roller assembly 24 to provide input and output torque drives without requiring secondary shaft finishing operations such as spline hobbing, etc. It further addresses shortcomings of using bearings with eccentric locking collars on round shafts.

A clamp 44 clamps the inner race 42 to the stub shaft 30 for rotation of the inner race 42 with the stub shaft 30 about an axis 41 of the shaft 26. Clamping of the inner race 42 to the stub shaft 30 eliminates or otherwise abates the potential of rotational knock and axial creep between the non-circular cross-section 38 and the bearing 40.

The clamp 44 acts between the stub shaft 30 and opposite sides of the inner races 42 for preventing the inner race 42 from moving either axially or radially relative to the shaft 30. Acting between one side of the inner race 42 (i.e., the right side in FIG. 4) and the disk portion 34 are a chamfered spacer ring 46 and a plurality of shims 48 (e.g., washers), the number of shims 48 being selected to properly axially position the bearing 40 along the axial portion 36 as discussed in more detail below. On the other side of the inner race 42 (i.e., the left side in FIG. 4) are more shims 50 (e.g., washers), a spacer ring 52, and a press plate 54 against which a fastener 56 (e.g., a threaded bolt) acts to clamp the inner race 42 in place via the press plate 54, the shims 48, 50, and the spacer rings 46, 52.

The bearing 40 further includes an outer race 56 that cooperates with the inner race 42 to capture a plurality of rotatable elements 57 (e.g., ball bearings) therebetween, The rotatable elements 57 do not tolerate undue axial loads well. As a result, the bearing 40 is mounted in such a way so as to avoid transmission of undue axial loads to the elements 57, as discussed below.

A bearing housing 58 is disposed about the outer race 56 so as to support the outer race 56, and in turn, the rest of the bearing 40, the clamp 44, and the shaft 26. The bearing housing 58 has an annular portion 60 to an outer periphery of which is joined a mounting flange arrangement which extends axially relative to the shaft axis 41 and includes one or more tabs 62. The annular portion 60 mates with a spherical outer surface of the outer race 56.

The tabs 62 extend axially from the annular portion 60 and are spaced circumferentially about the annular portion 60. Exemplarily, there are three tabs 62 (left, right, and center tabs in FIGS. 2 and 3) for mounting of the roller assembly 24, although, in some cases, the number of tabs 62 may be more or less.

A housing attachment arrangement 63 secures the bearing housing 58 to a mount 65 by a mounting force directed in a plane 71 oriented at a right angle to the axis 41. Exemplarily, the housing attachment arrangement 63 includes a fastener 64 for each tab 62. In the illustrated example, there are three fasteners 64 (left, right, and center fasteners in FIGS. 2 and 3), one respectively associated with each tab 62. Each fastener 64 secures the respective tab 62 to a mounting bracket 67 positioned radially outward from the tab 62 and fixed to a wall 69 of the baler housing 20 the mounting bracket 67 and the wall 69 cooperating to provide the mount 65.

As shown best in FIG. 4 with respect to one of the fasteners 64 (i.e., the center tab), each fastener 64 extends longitudinally in the plane 71 through an opening 66 formed in the tab 62 and an opening 68 formed in the mounting bracket 67 so as to secure the respective tab 62 to the bracket 67 with a mounting force directed in the plane 71. Since each fastener 64 acts in the plane 71 which is at a right angle to the axis 41, it does not act axially thereby avoiding transmission of an undue axial load to the bearing 40.

Exemplarily, each fastener 64 is a bolt. In such a case, the fastener 64 may have a threaded shank 76 that extends through the openings 66, 68, a head 78 fixed at one of the shank 76, a washer 80 between the head 78 and the bracket 70, and a nut 82 threadedly secured to the threaded portion of the shank 76.

As shown best in FIGS. 2 and 3, the mounting bracket 67 is, for example, V-shaped. As such, it has diverging left and right arms 84 and a vertex 86 interconnecting the left and right arms 84. The arms 84 and the vertex 86 are fixed to the wall 69. The center tab 62 is secured to the vertex 86 by use of the center fastener 64. The left tab 62 is secured to the left arm 84 by use of the left fastener 64. The right tab 62 is secured to the right arm 84 by use of the right fastener 64.

Each arm 84 has a base portion 88 and a radially flexible, cantilevered portion 90, as shown best in FIG. 2. The base portion 88 is fixed to the wall 69 whereas the radially flexible, cantilevered portion 90 is cantilevered to the base portion 88 at a proximal end of the portion 88 for radial flexure of a free end of the portion 88 upon attachment of the respective tab 62 thereto. The free end of the portion 88 has formed therein the respective opening 68 through which the fastener 64 extends longitudinally therethrough. The portion 90 is flexible to accommodate dimensional variation within the manufacturing tolerances of the associated components.

Figure 5:
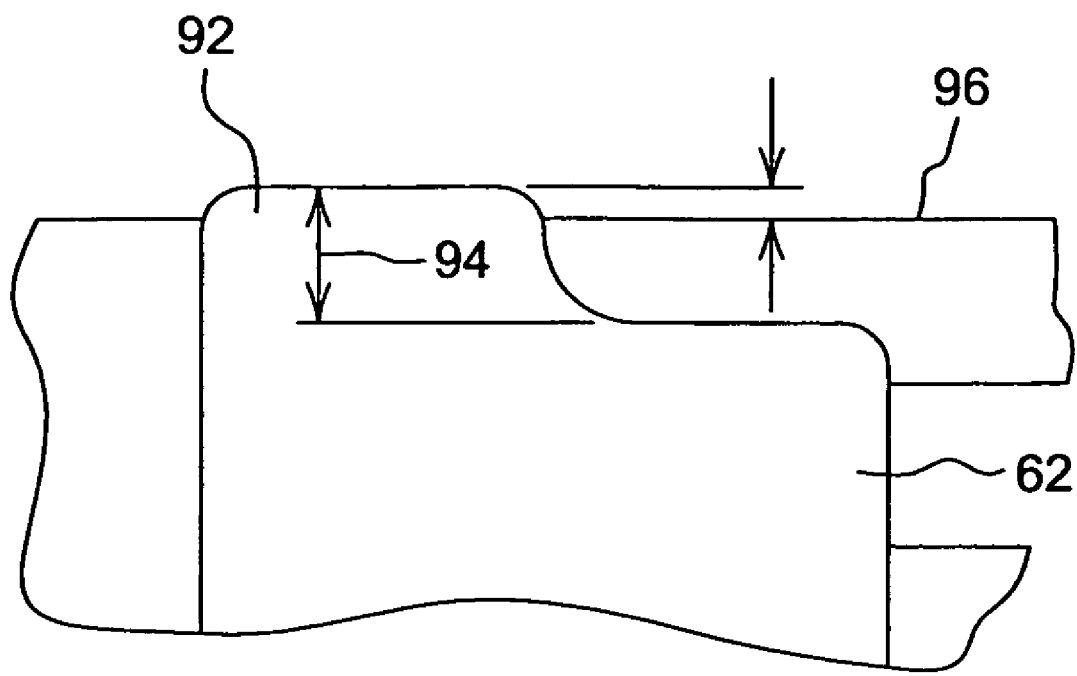
FIG. 5 is a view of an axial alignment guide of the roller assembly.

Referring to FIGS. 2-5 and, in particular, to FIG. 5, the bearing housing 58 includes an axial alignment guide for guiding axial alignment of the bearing housing relative to the mount 65 during assembly of the roller assembly 24. In the illustrated embodiment, the axial alignment guide comprises a step 92 protruding axially from each tab 62 such that an axial dimension 94 of each step 92 defines an axial position range. The bearing housing 58 is positioned such that an edge 96 of the mounting bracket 67 falls within the axial position range 94 defined by each step 92. Alignment of the beating housing 58 and thus the bearing 40 in this way minimizes the risk of transmission of an undue axial load to the bearing 40.

During assembly, the spacer ring 46 is installed on the stub shaft 36 and enough shims 48 are positioned between the inner race 42 and the ring 46 to align the bearing housing 58 axially such that the mounting bracket edge 96 is located within the axial position range 94 of each step 92. The fasteners 64 are then pre-installed by tightening the fasteners 64 only enough to achieve a light contact between the tabs 62 and the mounting bracket 67. Next, shims 50 and spacer ring 52 are installed on the other side of the inner race 42 after which the fastener 56 is tightened against the press ring 54 so as to clamp the inner race 42 to the stub shaft 30. After the inner race 42 is clamped, tightening of the middle fastener 64 is completed followed by tightening of the left and right fasteners 64, securing the tabs 62 to the mounting bracket 67 with the fasteners 64.

While the disclosure has been illustrated and described in detail in the drawings and foregoing description, such an illustration and description is to be considered as exemplary and not restrictive in character, it being understood that illustrative embodiments have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

The invention claimed is:

1. A roller assembly, comprising:
a shaft comprising a non-circular cross-section,
a bearing comprising an inner race, an outer race, and rotatable elements captured between the inner and outer races, the inner race mating generally with the non-circular cross-section and being clamped to the shaft for rotation therewith,
a bearing housing including an annular portion disposed about the outer race so as to support the bearing and having an outer periphery joined to a mounting flange arrangement extending axially, relative to an axis of said shaft,
a bearing mount including a vertical wall containing a circular hole disposed concentric with said shaft and including a mounting bracket joined to and extending axially from said wall and being radially outward of said bearing housing in close proximity to said mounting flange arrangement of said bearing housing, said mounting flange arrangement of said bearing housing including at least one axially extending tab, and said mounting bracket being positioned radially outward from the at least one tab, and said fastener arrangement including a fastener securing the tab to said mounting bracket and said mounting flange arrangement of the bearing housing includes a step defined at an end of said at least one axially extending tab such that an axial dimension of the step defines an axial position range, with the mounting bracket including an axially facing edge, and the bearing housing being positioned, such that the edge of the mounting bracket falls within the axial position range,
a housing attachment arrangement securing the bearing housing to the mount by a fastener arrangement coupled between said mounting bracket of said bearing mount and said mounting flange arrangement of said bearing housing and exerting a mounting force directed in a plane positioned at a right angle to said axis of the shaft.

2. The roller assembly of claim 1, wherein said housing attachment arrangement includes at least one fastener extending longitudinally in the plane in which the mounting force is directed.

3. The roller assembly of claim 2 wherein each of said mounting flange arrangement of the bearing housing and said mounting bracket of said bearing mount includes an opening therethrough, with the openings being in radial alignment with each other and with said at least one fastener extending through the openings.

4. The roller assembly of claim 3, wherein the opening in said mounting bracket of said bearing mount is axially elongated.

5. The roller assembly of claim 2, wherein said at least one fastener is a bolt.

6. The roller assembly of claim 1, wherein said mounting flange arrangement of the bearing housing includes multiple tabs, the housing attachment arrangement includes multiple fasteners, and each fastener secures a respective one of the tabs to the mounting bracket.

7. The roller assembly of claim 6 wherein said mounting bracket of said bearing mount has a V-shape defined by first and second arms diverging from a vertex, with said bearing housing having a peripheral region conforming to said V-shape and being in engagement with said arms; and said multiple tabs including first second and third tabs respectively located radially inwardly of said arms and said vertex, with said multiple fasteners including first, second and third fasteners respectively connecting said first, second and third tabs to said vertex, first arm and second arm.

8. The roller assembly of claim 7 wherein said first and second arms respectively include radially flexible cantilevered portions and wherein said second and third fasteners respectively extend through openings provided in free end regions of said first and second cantilevered portions.

9. The roller assembly of claim 1, wherein the mounting bracket comprises a radially flexible portion to which the tab is secured by the fastener.

\* \* \* \* \*